US011292423B2

(12) United States Patent
Gerlach

(10) Patent No.: US 11,292,423 B2
(45) Date of Patent: Apr. 5, 2022

(54) VENT FLAP FOR AIRBAG ASSEMBLIES

(71) Applicant: Autoliv ASP, Inc., Ogden, UT (US)

(72) Inventor: Nathaniel Lee Gerlach, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 59 days.

(21) Appl. No.: 16/877,175

(22) Filed: May 18, 2020

(65) Prior Publication Data

US 2021/0354652 A1 Nov. 18, 2021

(51) Int. Cl.
*B60R 21/239* (2006.01)
*B60R 21/231* (2011.01)
*B60R 21/21* (2011.01)

(52) U.S. Cl.
CPC ............ *B60R 21/239* (2013.01); *B60R 21/21* (2013.01); *B60R 21/23138* (2013.01); *B60R 2021/2395* (2013.01)

(58) Field of Classification Search
None
See application file for complete search history.

(56) References Cited

U.S. PATENT DOCUMENTS

| | | | |
|---|---|---|---|
| 2,937,380 A | 5/1960 | Reese | |
| 3,887,213 A | 6/1975 | Goetz | |
| 4,169,613 A | 10/1979 | Barnett | |
| 4,181,325 A | 1/1980 | Barnett | |
| 4,805,930 A | 2/1989 | Takada | |
| 5,016,913 A | 5/1991 | Nakajima et al. | |
| 5,172,933 A | 12/1992 | Strasser | |
| 5,186,488 A | 2/1993 | Takano | |
| 5,240,283 A | 8/1993 | Kishi et al. | |
| 5,246,250 A | 9/1993 | Wolanin et al. | |
| 5,280,953 A | 1/1994 | Wolanin et al. | |

(Continued)

FOREIGN PATENT DOCUMENTS

| AU | 2005294731 | | 8/2012 |
|---|---|---|---|
| DE | 19640322 | A1 | 3/1996 |

(Continued)

OTHER PUBLICATIONS

International Search Report and Written Opinion dated Mar. 29, 2017 for international application PCT/US2017/012169.

*Primary Examiner* — Faye M Fleming
(74) *Attorney, Agent, or Firm* — Stoel Rives LLP

(57) ABSTRACT

A side inflatable airbag assembly for a vehicle is disclosed. Inflatable airbag assemblies may provide protection for an occupant in a vehicle collision event. In a side collision event, or other event producing lateral movement of the occupant relative to the vehicle, the disclosed inflatable airbag assembly may receive and support the occupant during ride-down so as to prevent or minimize injury resulting from impact with a vehicle sidewall. An inflatable airbag cushion of the inflatable airbag assembly comprises a valve with an aperture and a vent flap that has a strong connection and a weak connection to the inflatable airbag cushion. The disclosed airbag may differentially support the occupant by providing varied degrees of support for the shoulder, pelvis, and torso, which may be particularly beneficial to an elderly occupant whose bones may be more susceptible to some injury types and modes as a result of age-incident health issues.

20 Claims, 6 Drawing Sheets

(56) References Cited

U.S. PATENT DOCUMENTS

| | | | |
|---|---|---|---|
| 5,290,953 | A | 3/1994 | Clark, Jr. et al. |
| 5,306,043 | A | 4/1994 | Mihm et al. |
| 5,350,188 | A | 9/1994 | Sato |
| 5,405,166 | A | 4/1995 | Rogerson |
| 5,421,607 | A | 6/1995 | Gordon |
| 5,492,363 | A | 2/1996 | Hartmeyer et al. |
| 5,494,314 | A | 2/1996 | Kriska et al. |
| 5,520,413 | A | 5/1996 | Mossi et al. |
| 5,603,526 | A | 2/1997 | Buchanan |
| 5,775,729 | A | 7/1998 | Schneider et al. |
| 5,839,755 | A | 11/1998 | Turnbull |
| 5,931,497 | A | 8/1999 | Fischer |
| 5,945,184 | A | 8/1999 | Nagata et al. |
| 6,017,057 | A | 1/2000 | O'Docherty |
| 6,056,318 | A | 5/2000 | Braunschadel |
| 6,095,557 | A | 8/2000 | Takimoto et al. |
| 6,126,196 | A | 10/2000 | Zimmerman |
| 6,139,048 | A | 10/2000 | Braunschadel |
| 6,183,003 | B1 | 2/2001 | Matsuhashi et al. |
| 6,206,408 | B1 | 3/2001 | Schneider |
| 6,247,726 | B1 | 6/2001 | Ryan |
| 6,290,257 | B1 | 9/2001 | Bunce et al. |
| 6,371,509 | B1 | 4/2002 | Ellerbrok et al. |
| 6,390,501 | B1 | 5/2002 | Greib et al. |
| 6,398,258 | B2 | 6/2002 | Hamada et al. |
| 6,419,267 | B1 | 7/2002 | Hashimoto et al. |
| 6,554,313 | B2 | 4/2003 | Uchida |
| 6,631,921 | B1 | 10/2003 | Drossler et al. |
| 6,631,922 | B2 | 10/2003 | Hess et al. |
| 6,648,371 | B2 | 11/2003 | Vendely |
| 6,722,695 | B2 | 4/2004 | Kobayashi et al. |
| 6,746,045 | B2 | 6/2004 | Short et al. |
| 6,773,027 | B2 | 8/2004 | Bohn et al. |
| 6,773,030 | B2 | 8/2004 | Vischer |
| 6,784,379 | B2 | 8/2004 | Breed et al. |
| 6,786,505 | B2 | 9/2004 | Yoshida et al. |
| 6,832,778 | B2 | 12/2004 | Pinsenschaum et al. |
| 6,863,304 | B2 | 3/2005 | Reiter et al. |
| 6,918,613 | B2 | 7/2005 | Short et al. |
| 6,932,385 | B2 | 8/2005 | Hawthorn et al. |
| 6,962,363 | B2 | 11/2005 | Wang et al. |
| 6,971,664 | B2 | 12/2005 | Amamori et al. |
| 6,971,671 | B2 | 12/2005 | Schneider et al. |
| 7,059,634 | B2 | 6/2006 | Bossecker et al. |
| 7,066,487 | B2 | 6/2006 | Sullivan et al. |
| 7,083,191 | B2 | 8/2006 | Fischer |
| 7,083,192 | B2 | 8/2006 | Fischer et al. |
| 7,195,281 | B2 | 3/2007 | Williams et al. |
| 7,210,702 | B2 | 5/2007 | Soderquist |
| 7,237,802 | B2 | 7/2007 | Rose et al. |
| 7,261,319 | B2 | 8/2007 | Depottey et al. |
| 7,328,915 | B2 | 2/2008 | Smith et al. |
| 7,347,450 | B2 | 3/2008 | Williams et al. |
| 7,360,789 | B2 | 4/2008 | Bito |
| 7,364,192 | B2 | 4/2008 | Braun et al. |
| 7,377,548 | B2 | 5/2008 | Bauer et al. |
| 7,413,218 | B2 | 8/2008 | Ekdahl |
| 7,441,805 | B2 | 10/2008 | Jamison et al. |
| 7,445,237 | B2 * | 11/2008 | Boyle, III ............ B60R 21/233 280/739 |
| 7,556,290 | B2 | 7/2009 | Williams et al. |
| 7,568,729 | B2 | 8/2009 | Schnieder et al. |
| 7,597,355 | B2 | 10/2009 | Williams et al. |
| 7,597,356 | B2 | 10/2009 | Williams |
| 7,600,782 | B2 | 10/2009 | Ishiguro et al. |
| 7,604,252 | B2 | 10/2009 | Heitplatz et al. |
| 7,607,689 | B2 | 10/2009 | Kalczynski et al. |
| 7,607,690 | B2 | 10/2009 | Abe et al. |
| 7,614,653 | B2 | 11/2009 | Rose et al. |
| 7,614,654 | B2 | 11/2009 | Williams |
| 7,651,130 | B2 | 1/2010 | Bauberger |
| 7,654,561 | B2 | 2/2010 | Webber et al. |
| 7,673,899 | B2 | 3/2010 | Abe |
| 7,722,080 | B2 | 5/2010 | Rose et al. |
| 7,726,685 | B2 | 6/2010 | Abe et al. |
| 7,748,738 | B2 | 7/2010 | Schneider |
| 7,762,576 | B2 | 7/2010 | Cho |
| 7,770,925 | B2 | 8/2010 | Seymour et al. |
| 7,770,926 | B2 | 8/2010 | Schneider et al. |
| 7,784,828 | B2 | 8/2010 | Matsu et al. |
| 7,845,681 | B2 * | 12/2010 | Abe ..................... B60R 21/239 280/743.1 |
| 7,857,347 | B2 | 12/2010 | Abe et al. |
| 7,878,538 | B2 | 2/2011 | Abe et al. |
| 7,931,297 | B2 | 4/2011 | Abe et al. |
| 7,938,444 | B2 | 5/2011 | Williams et al. |
| 7,938,445 | B2 | 5/2011 | Smith et al. |
| 7,946,613 | B2 | 5/2011 | Rose et al. |
| 7,959,184 | B2 | 6/2011 | Fukawatase et al. |
| 8,047,570 | B2 | 11/2011 | Feller |
| 8,070,183 | B2 | 12/2011 | Kumagai et al. |
| 8,191,925 | B2 | 6/2012 | Williams |
| 8,226,118 | B2 | 7/2012 | Rose et al. |
| 8,353,532 | B2 * | 1/2013 | Abe ..................... B60R 21/239 280/739 |
| 8,646,808 | B2 | 2/2014 | Williams |
| 8,684,407 | B2 * | 4/2014 | Fischer ............... B60R 21/2338 280/743.2 |
| 8,882,143 | B2 | 11/2014 | Williams et al. |
| 9,150,188 | B2 | 10/2015 | Williams et al. |
| 9,272,685 | B2 * | 3/2016 | Fischer ................ B60R 21/239 |
| 9,403,503 | B2 * | 8/2016 | Buchholz ............. B60R 21/239 |
| 9,676,364 | B2 * | 6/2017 | Williams ............ B60R 21/2338 |
| 10,093,270 | B2 | 10/2018 | Hatfield |
| 2002/0117840 | A1 | 8/2002 | Dunkle et al. |
| 2003/0020266 | A1 | 1/2003 | Vendely et al. |
| 2003/0030254 | A1 | 2/2003 | Hasebe |
| 2003/0057691 | A1 | 3/2003 | Tokita et al. |
| 2003/0020268 | A1 | 6/2003 | Reiter et al. |
| 2003/0127839 | A1 | 7/2003 | Jenkins |
| 2003/0201630 | A1 | 10/2003 | Moon |
| 2003/0209895 | A1 | 11/2003 | Gu |
| 2003/0214125 | A1 | 11/2003 | Schneider et al. |
| 2003/0222446 | A1 | 12/2003 | Soderquist et al. |
| 2004/0012179 | A1 | 1/2004 | Pinsenschaum et al. |
| 2004/0056459 | A1 | 3/2004 | Kassman et al. |
| 2004/0090054 | A1 | 5/2004 | Bossecker et al. |
| 2004/0130135 | A1 | 7/2004 | Ekdahl |
| 2004/0188990 | A1 | 9/2004 | Short et al. |
| 2004/0256842 | A1 | 12/2004 | Breed |
| 2005/0052008 | A1 | 3/2005 | Rose et al. |
| 2005/0057027 | A1 | 3/2005 | Fogle, Jr. et al. |
| 2005/0098990 | A1 | 5/2005 | Pinsenschaum et al. |
| 2005/0236822 | A1 | 10/2005 | Rose et al. |
| 2005/0248137 | A1 | 11/2005 | Delventhal et al. |
| 2006/0001244 | A1 | 1/2006 | Taguchi et al. |
| 2006/0071461 | A1 | 4/2006 | Williams et al. |
| 2006/0071462 | A1 | 4/2006 | Smith et al. |
| 2006/0151979 | A1 | 7/2006 | Depottey et al. |
| 2006/0192370 | A1 | 8/2006 | Abe et al. |
| 2006/0197327 | A1 | 9/2006 | Maripudi et al. |
| 2006/0202454 | A1 | 9/2006 | Parizal et al. |
| 2006/0284404 | A1 | 12/2006 | Green et al. |
| 2007/0045997 | A1 | 3/2007 | Abe et al. |
| 2007/0052222 | A1 | 3/2007 | Higuchi et al. |
| 2007/0108750 | A1 | 5/2007 | Bauer et al. |
| 2007/0126218 | A1 | 6/2007 | Schneider et al. |
| 2007/0126219 | A1 | 6/2007 | Williams |
| 2007/0132222 | A1 | 6/2007 | Thomas et al. |
| 2007/0145729 | A1 | 6/2007 | Ishiguro et al. |
| 2007/0205590 | A1 | 9/2007 | Klinkenberger et al. |
| 2007/0216146 | A1 | 9/2007 | Williams |
| 2008/0007038 | A1 | 1/2008 | Fischer et al. |
| 2008/0018086 | A1 | 1/2008 | Ford et al. |
| 2008/0023950 | A1 | 1/2008 | Kalczynski et al. |
| 2008/0023959 | A1 | 1/2008 | Crawford |
| 2008/0073890 | A1 | 3/2008 | Williams et al. |
| 2008/0073891 | A1 | 3/2008 | Rose et al. |
| 2008/0073892 | A1 | 3/2008 | Rose et al. |
| 2008/0073893 | A1 | 3/2008 | Schneider |
| 2008/0079250 | A1 | 4/2008 | Boyle et al. |
| 2008/0203713 | A1 | 8/2008 | McFadden et al. |
| 2008/0303256 | A1 | 12/2008 | Williams |
| 2009/0033081 | A1 | 2/2009 | Flischer et al. |

(56) References Cited

U.S. PATENT DOCUMENTS

| | | |
|---|---|---|
| 2009/0039630 A1 | 2/2009 | Schneider et al. |
| 2009/0121460 A1 | 5/2009 | Abe et al. |
| 2009/0230663 A1 | 9/2009 | Mills et al. |
| 2009/0256338 A1 | 10/2009 | Williams |
| 2010/0019476 A1 | 1/2010 | Pausch |
| 2010/0032931 A1 | 2/2010 | Kumagai et al. |
| 2010/0102542 A1 | 4/2010 | Nakajima et al. |
| 2010/0140908 A1 | 6/2010 | Abe |
| 2010/0225094 A1 | 9/2010 | Rose et al. |
| 2010/0225095 A1 | 9/2010 | Smith et al. |
| 2011/0031725 A1 | 2/2011 | Rose et al. |
| 2012/0038138 A1 | 2/2012 | Kuhne et al. |
| 2012/0280477 A1 | 11/2012 | Young et al. |
| 2013/0042441 A1 | 2/2013 | Maurer |
| 2014/0062071 A1 | 3/2014 | Ishiguro et al. |
| 2014/0225354 A1 | 8/2014 | Williams et al. |
| 2015/0021889 A1 | 1/2015 | Williams et al. |
| 2015/0042080 A1 | 2/2015 | Guerrero et al. |
| 2017/0197578 A1 | 7/2017 | Hatfield |

FOREIGN PATENT DOCUMENTS

| | | | |
|---|---|---|---|
| DE | 10059956 A1 | 6/2002 | |
| DE | 19517315 C2 | 4/2003 | |
| DE | 102004049513 A1 | 4/2006 | |
| EP | 0458838 B1 | 5/1996 | |
| EP | 1398228 A2 | 3/2004 | |
| EP | 1824710 B1 | 6/2009 | |
| EP | 1960240 B1 | 8/2011 | |
| GB | 2328646 A | 3/1999 | |
| JP | 03281460 | 12/1991 | |
| JP | 05085295 A | 4/1993 | |
| JP | 08268213 | 10/1996 | |
| JP | 2001158315 | 6/2001 | |
| JP | 2003137060 | 5/2003 | |
| JP | 2004262432 A | 9/2004 | |
| JP | 4871286 B2 | 2/2012 | |
| MX | 282893 | 1/2011 | |
| WO | 2004045919 A1 | 6/2004 | |
| WO | 2006041547 A2 | 4/2006 | |
| WO | 2006041552 A2 | 4/2006 | |
| WO | 2006073534 A2 | 7/2006 | |
| WO | 2007067371 A2 | 6/2007 | |
| WO | 2007067377 A2 | 6/2007 | |
| WO | 2008150578 A1 | 12/2008 | |
| WO | 2009020786 A1 | 2/2009 | |
| WO | 2010101673 A1 | 9/2010 | |
| WO | WO-2015120039 A1 * | 8/2015 | ........... B60R 21/239 |

* cited by examiner

VENT FLAP FOR AIRBAG ASSEMBLIES

TECHNICAL FIELD

The present disclosure relates generally to the field of automotive protective systems. More specifically, the present disclosure relates to vents for airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
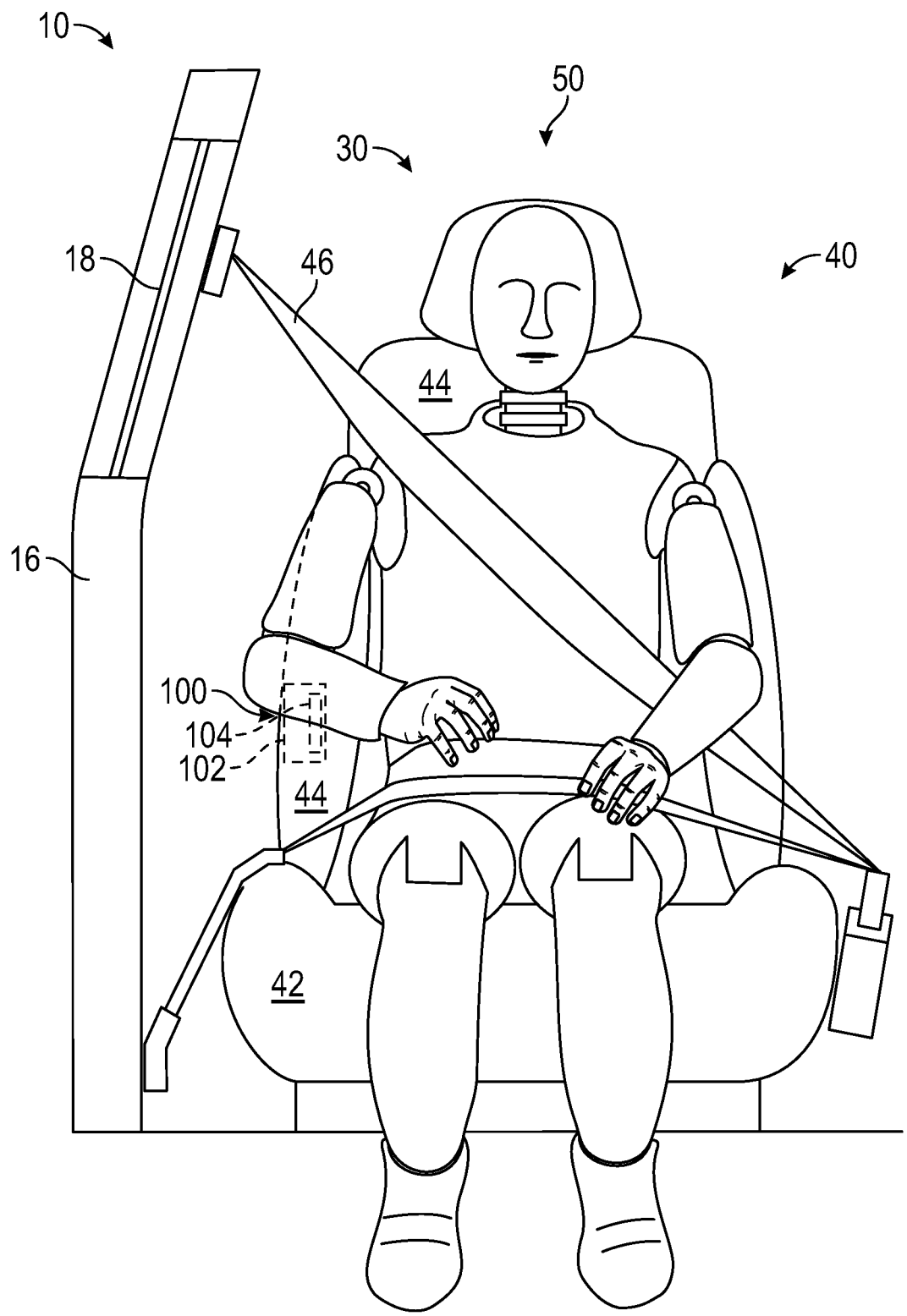
FIG. 1 is a front view of a portion of an interior of a vehicle with an inflatable airbag assembly in an undeployed configuration, according to an embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. An airbag assembly can mitigate injury to an occupant of a vehicle during a collision event by reducing the effect of impact of the occupant against structures (body-structure impact) within the vehicle (e.g., a door column, vehicle sidewall, or center console). Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. The present disclosure may be described in a context of airbag assemblies that may afford protection particularly beneficial for an occupant involved in a side-impact collision or other event producing lateral movement (e.g., transverse to a longitudinal axis of the vehicle) of the occupant. However, the disclosed valve assemblies, including an aperture (or vent) and a vent flap, may be used in a number of different types of airbags discussed above. For example, the embodiments disclosed herein may be utilized with airbag assemblies more suitable to cushion a front-seat passenger, while also utilized in other airbag assemblies that may be more particularly suitable for a passenger of a seat other than the front seat, such as a more rearward seat. In the following disclosure, "airbag" generally refers to an inflatable airbag that deploys at a side position (or at a position generally laterally adjacent to a vehicle seating position) to protect an occupant during a collision event.

During installation, airbags are typically disposed at an interior of a housing in a packaged state or configuration (e.g., are rolled, folded, and/or otherwise compressed) or a compact configuration and may be retained in the packaged state or configuration behind a cover. During a collision event, an inflator is triggered, which rapidly fills the airbag with inflation gas. The airbag can rapidly transition from the packaged state to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors during a collision event.

Some embodiments disclosed herein can provide improved positioning, cushioning, and/or safety to occupants involved in particular types of collisions. For example, some embodiments can be configured to cushion a vehicle driver and/or front-seat passenger seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap frontal crash test and the NHTSA oblique impact test are disclosed in the Insurance Institute for Highway Safety, Small Overlap Frontal Crashworthiness Evaluation Crash Test Protocol (Version II) (Dec. 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing-described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the vehicle-forward direction.

FIG. 1 is front view of a portion of an interior of a vehicle 10 having an inflatable airbag assembly 100 in an undeployed configuration, according to an embodiment of the present disclosure. In the illustrated embodiment of FIG. 1, the inflatable airbag assembly 100 is a side airbag assembly. A sidewall 16 (e.g., a door) and a window 18 are shown for reference. The vehicle 10 includes at least one vehicle seating position 30. The vehicle seating position 30 of FIG. 1 can be defined by a seat assembly 40, which may include a seat 42, a seatback 44, and a restraint harness 46 (e.g., a seat belt). FIG. 1 shows an occupant 50 in the seat assembly 40 positioned in the vehicle seating position 30. The inflatable airbag assembly 100 may be mounted to or otherwise coupled to the seatback 44.

The inflatable airbag assembly 100 comprises a housing 102 and an inflator 104. The housing 102, in one embodiment, may be mounted to an interior portion of the seatback 44. The inflator 104 may be coupled to the housing 102, and may be disposed partially or completely within the housing 102.

Although FIG. 1 and other figures may illustrate the occupant 50 with the restraint harness 46 employed, the operation of the inflatable airbag assembly 100 is independent of, and does not depend in any way on, the restraint harness 46.

Figure 2:
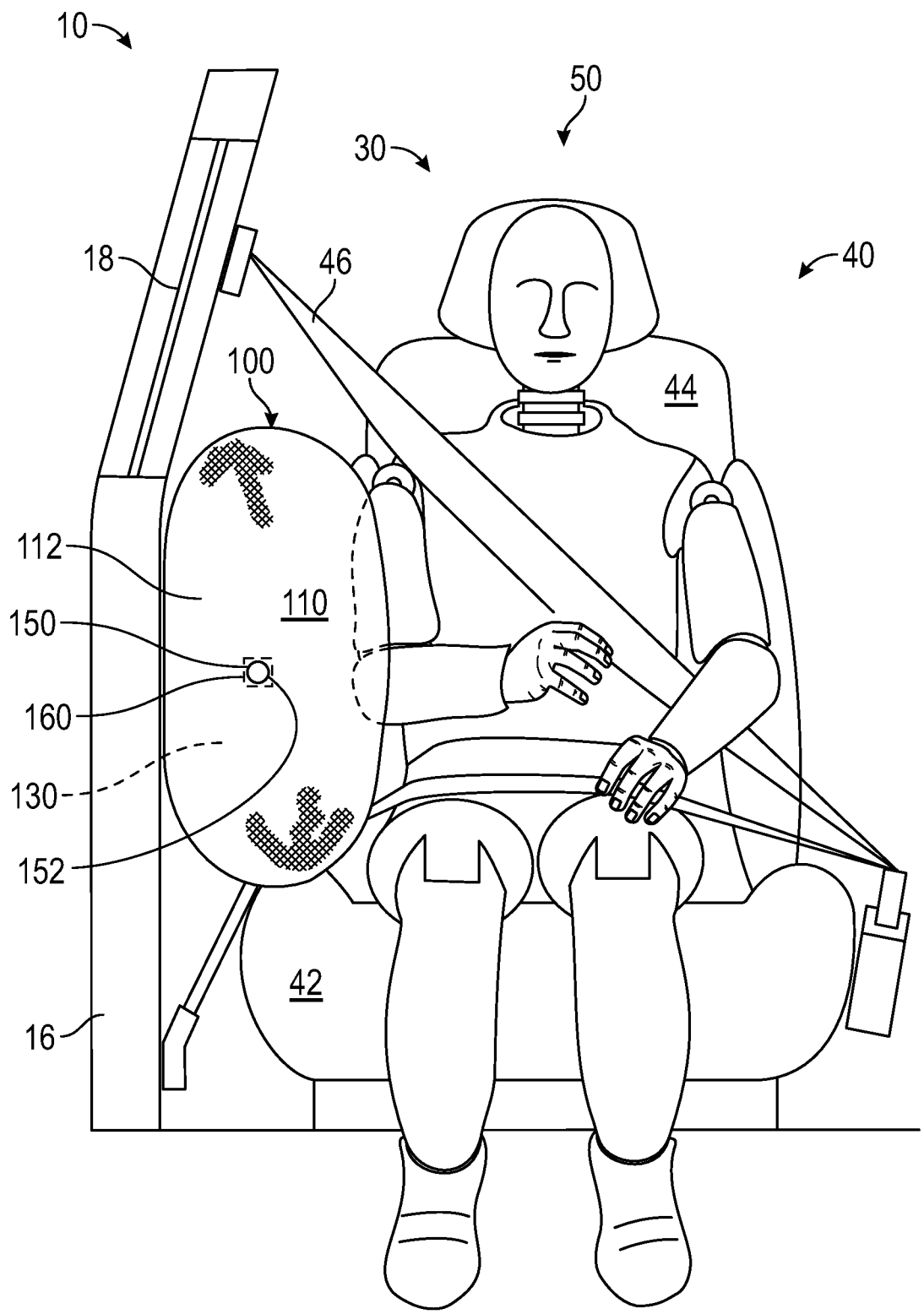
FIG. 2 is a front view of a portion of the interior of the vehicle with the inflatable airbag assembly of FIG. 1 in a deployed configuration and at least partially inflated.

FIG. 2 is a front view of a portion of the interior of the vehicle 10, showing the inflatable airbag assembly 100 in a deployed configuration and at least partially inflated. The sidewall 16 (e.g., a door or other panel) and window 18 of the vehicle 10 are shown for reference. The vehicle seating position 30 and the seat assembly 40, including the seat 42, seatback 44, and restraint harness 46, are shown for reference. The occupant 50 is shown seated in the seat assembly 40 prior to engaging the inflatable airbag assembly 100. The inflatable airbag assembly 100 includes an inflatable airbag cushion 110. The inflatable airbag cushion 110 comprises a panel 112 that at least partially defines a chamber 130 within the inflatable airbag cushion 110. The panel 112 may be fabricated from a fabric material or any other suitable material. The chamber 130 may be inflated and expanded by the inflator 104 (see FIG. 1) via an inflator port (see, e.g., 106 in FIG. 4) to an inflation pressure, the chamber 130 being in fluid communication with the inflator 104.

The inflatable airbag assembly 100 may be deployed by action of the inflator 104 (see FIG. 1), which may be activated by, for example, one or more sensors detecting the vehicle 10 being involved in a collision event. The inflator 104 may provide inflation gas to the inflatable airbag cushion 110 via the inflator port 106 (see FIG. 4), and may thereby cause the inflatable airbag cushion 110 to deploy from the housing 102 and begin inflating. The inflatable airbag cushion 110 may inflate to be disposed forward from the housing 102 at the seatback 44 to a position laterally adjacent to the vehicle seating position 30 and, more particularly in one embodiment, between the vehicle seating position 30 and the sidewall 16 of the vehicle 10. In the illustrated embodiment, the inflatable airbag cushion 110 is positioned in the deployed configuration and is configured to receive and engage the occupant 50. The sidewall 16 (e.g., door) of the vehicle 10 may serve as a reaction surface to provide a support to the inflatable airbag cushion 110.

The inflatable airbag cushion 110 may further comprise a valve 150 disposed in the panel 112. The valve 150 comprises an aperture 152 (or vent) and a vent flap 160. The aperture 152 is disposed through the panel 112 to operate as a vent to permit inflation gas to exit the chamber 130 of the inflatable airbag cushion 110 in a deployed configuration.

Figure 3:
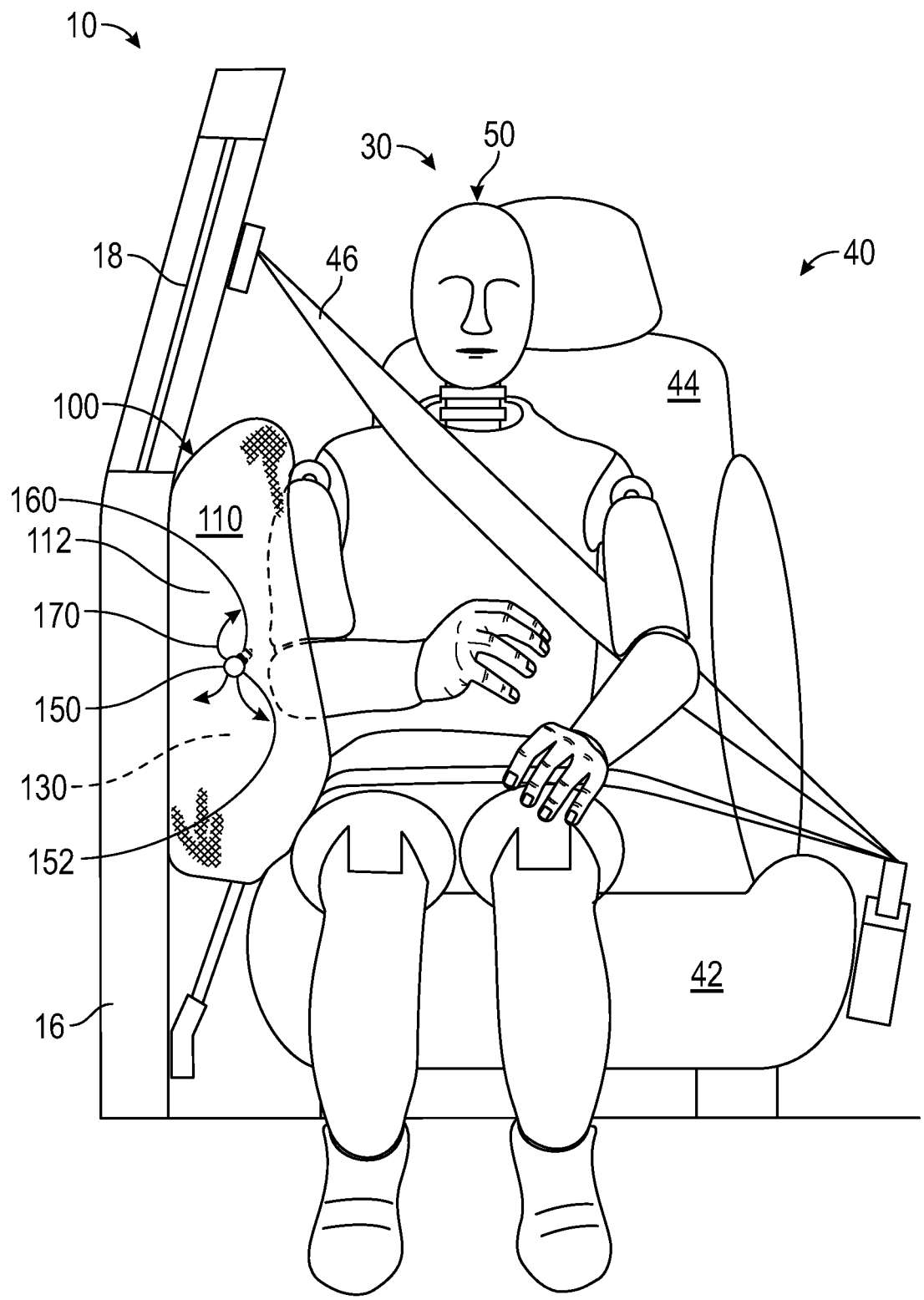
FIG. 3 is a front view of a portion of the interior of the vehicle with the inflatable airbag assembly of FIG. 1 in a deployed configuration and with an occupant engaging an inflatable airbag cushion.

The valve 150 comprises a closed configuration, position, or state (see FIG. 2) and an open configuration, position, or state (see FIG. 3). In the closed configuration, the vent flap 160 (or closure) is coupled to the panel 112 at the aperture 152 and occludes the aperture 152 before the occupant 50 engages the inflatable airbag cushion 110. The occlusion of the aperture 152 by the vent flap 160 limits or may even prevent the passage of inflation gas from the chamber 130 through the aperture 152. The vent flap 160 may be a fabric or another suitable material that prevents inflation gas to pass through the vent flap 160 while the vent flap 160 is covering or occluding the aperture 152.

FIG. 3 is a front view of a portion of the interior of the vehicle 10, showing the inflatable airbag assembly 100 of FIGS. 1 and 2 in a deployed configuration and at least partially inflated state, with the occupant 50 engaging the inflatable airbag cushion 110 and the valve 150 is the open configuration. FIG. 3 illustrates that the occupant 50 has traveled in a lateral direction in comparison to FIG. 2 and the occupant 50 is engaging the inflatable airbag cushion 110. The chamber 130 is inflated to achieve a predetermined pressure and/or to receive the occupant 50.

Ride-down occurs after an occupant 50 engages with the inflated inflatable airbag cushion 110 and through the venting of inflation gas 170 through the aperture 152 to gradually deflate the inflatable airbag cushion 110.

The valve 150 and the vent flap 160 are configured to facilitate ride-down of the occupant 50 at impact with the inflatable airbag cushion 110 by venting the inflation gas 170 from within the chamber 130 to outside of the chamber 130. The inflatable airbag cushion 110 is positioned between the sidewall 16 of the vehicle 10 and the occupant 50 and is configured to engage the occupant 50 and slow down the occupant 50 in the ride-down phase so that the occupant 50 does not engage the sidewall 16 of the vehicle 10 at high speeds.

The aperture 152 of the valve 150 is configured to open at a predetermined time (e.g., a target pressurization of the inflatable airbag cushion 110) to vent the inflation gas 170 from within the chamber 130 to outside the chamber 130. The aperture 152 is configured to open by displacement of the vent flap 160 relative to the aperture 152. Pressurized inflation gas within the chamber 130 displaces the vent flap 160. Displacement of the vent flap 160 relative to the aperture 152 enables the inflation gas 170 to pass through the aperture 152 and depressurize the chamber 130 of the inflatable airbag cushion 110. In the illustrated embodiment, a portion of the vent flap 160 is partially disposed out of the chamber 130 through the aperture 152.

In some embodiments, the vent flap 160 is configured to open the aperture 152 when the chamber 130 of the inflatable airbag cushion 110 reaches a predetermined pressure threshold. Once the chamber 130 reaches the predetermined pressure threshold, the vent flap 160 is displaced so as to not cover or occlude the aperture 152 to enable the inflation gas 170 to vent out of the chamber 130 of the inflatable airbag cushion 110.

In some embodiments, the vent flap 160 is configured to open the aperture 152 when the chamber 130 of the inflatable airbag cushion 110 achieves a predetermined amount of deformation after the occupant 50 engages with the inflatable airbag cushion 110. In some embodiments, when the occupant 50 engages with the inflatable airbag cushion 110, the chamber 130 of the inflatable airbag cushion 110 reaches the predetermined pressure threshold.

Figure 4:
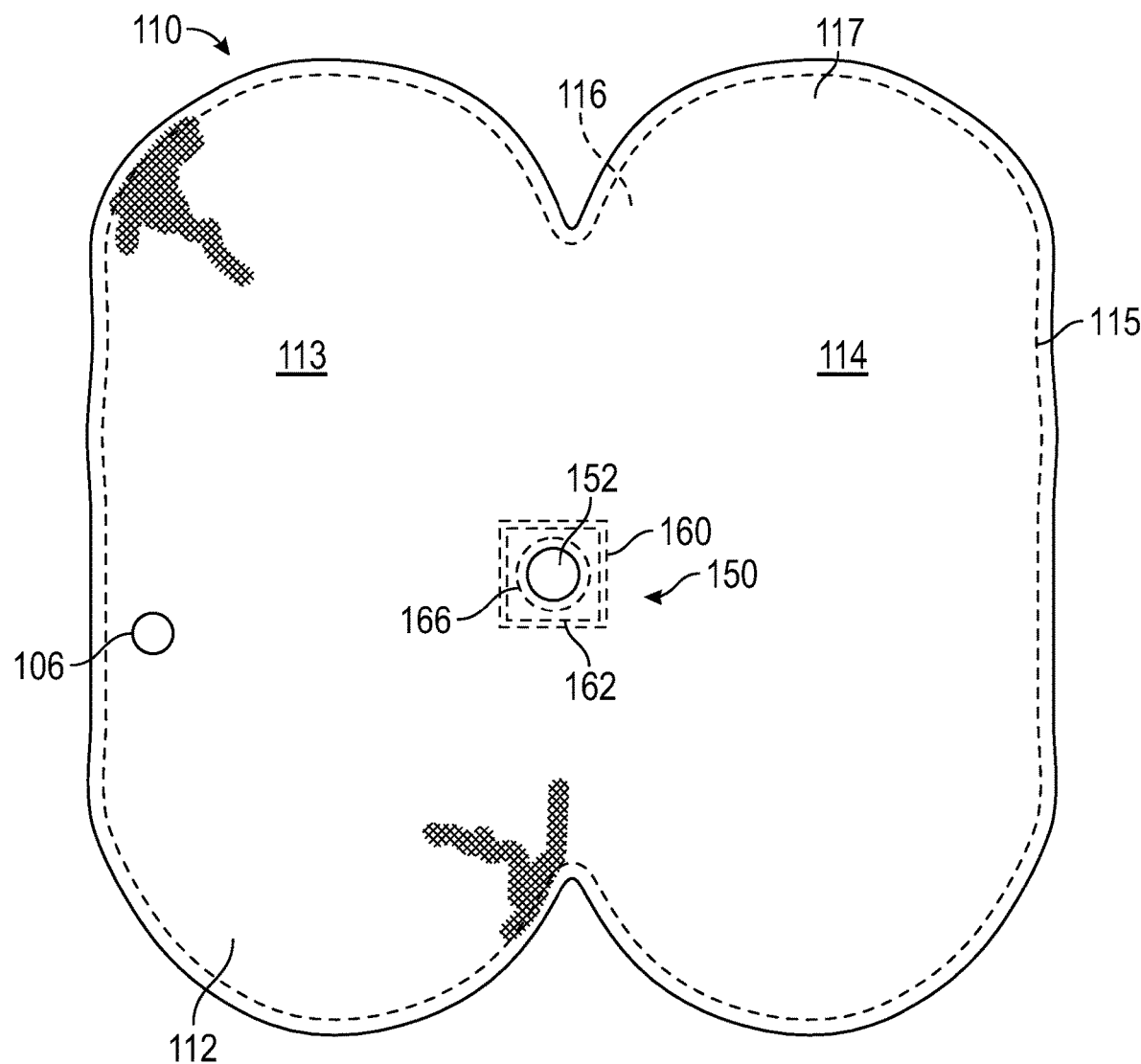
FIG. 4 is a side view of the inflatable airbag cushion of FIGS. 1 and 2 in an unassembled configuration.

FIG. 4 is a side view of the inflatable airbag cushion 110 of FIGS. 1-3 in an unassembled configuration. The inflatable airbag cushion 110 comprises the panel 112 that may be fabricated from fabric or another suitable material. The panel 112 may comprise a first portion 113 and a second portion 114. The first portion 113 and the second portion 114 may have a substantially similar shape, allowing the first portion 113 to be folded onto the second portion 114. Coupling the first portion 113 to the second portion 114 forms the chamber 130. The first portion 113 may be coupled to the second portion 114 via stitching 115 along a perimeter of the panel 112. The panel 112 of the inflatable airbag cushion 110 has an internal chamber-facing surface 116 and an external surface 117. In other embodiments, the inflatable airbag cushion 110 may comprise a plurality of the panels 112 to form the inflatable airbag cushion 110.

The panel 112 of the inflatable airbag cushion 110 comprises the inflator port 106 that may be coupled to or be in fluid communication with the inflator 104. The inflator port 106 enables the inflator 104 to receive inflation gas to inflate and expand the chamber 130 created by the panel 112.

The panel 112 of the inflatable airbag cushion 110 further includes the valve 150. The valve 150 includes the aperture 152 and the vent flap 160. In the illustrated embodiment, the vent flap 160 is coupled to the internal (chamber-facing) surface 116 of the panel 112. In other embodiments, the vent flap 160 may be coupled to the external surface 117 of the panel 112. The vent flap 160 may be coupled to the panel 112 in a number of different ways. In the illustrated embodiment, the vent flap 160 may be coupled to the panel 112 via stitching, such as stitching 162. Additional stitching 166 may also couple the vent flap 160 to the panel 112, or alternatively may simply reinforce the aperture 152 and not couple the vent flap 160 to the panel 112. In the illustrated embodiment, the stitching 162 is a rectangular stitching whereas the stitching 166 is circular stitching. The valve 150 may be include one or both of the different stitching 162, 166.

Figure 5:
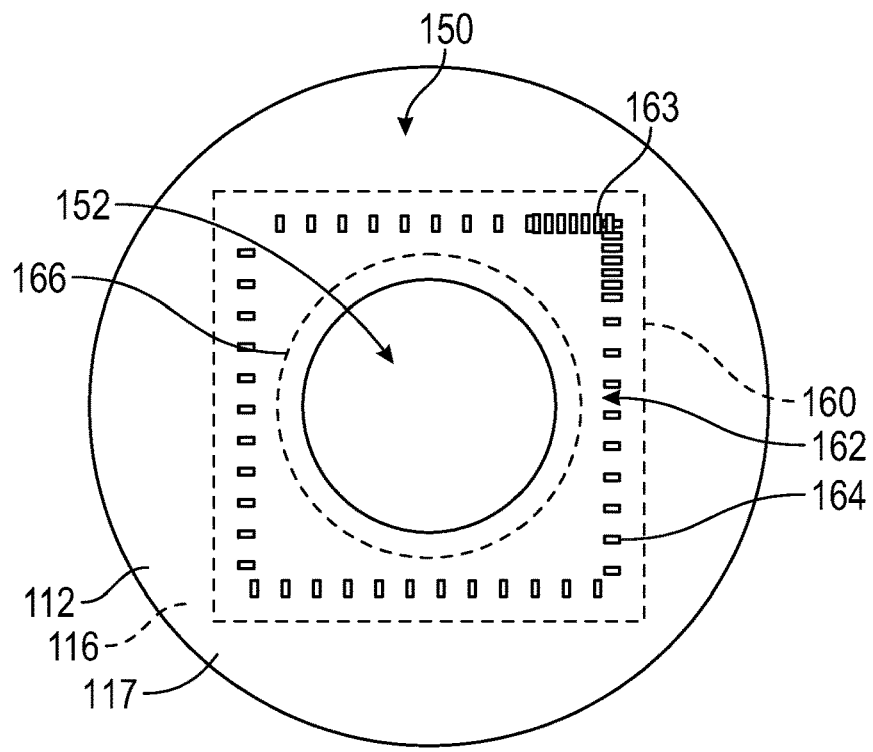
FIG. 5 is a detailed view of a valve including an aperture and a vent flap in a closed configuration, according to one embodiment of the present disclosure.

FIGS. 5-8 illustrate a detailed view of various embodiments of the valve 150. FIG. 5 illustrates the valve 150 in a closed configuration, position or state. As discussed above, the valve 150 includes the aperture 152 and the vent flap 160 that occludes or covers the apertures 152. The vent flap 160 may be a fabric or any other sort of material that substantially limits air from passing through the vent flap 160 when the vent flap 160 is in the closed position or configuration that occludes or covers the aperture 152. The vent flap 160 may have a substantially rectangular shape. The vent flap 160 is illustrated in broken lines because the vent flap 160 is coupled to the internal chamber-facing surface 116 of the panel 112. However, the present disclosure is not so limited, and the vent flap 160 may have any of a number of different shapes, such as circular, square, triangular, polygonal, and the like. The vent flap 160 may alternatively be coupled to an external (outward facing) surface of the panel 112.

As indicated, the vent flap 160 of FIG. 5 may be coupled to the internal chamber-facing surface 116 of the panel 112. In the illustrated embodiment, the vent flap 160 is coupled to the internal chamber-facing surface 116 via the stitching 162. The stitching 162 comprises a strong stitching 163 and a weak stitching 164. The terms "strong" and "weak" are used to compare how the strong stitching 163 and weak stitching 164 relate to each other. In other words, the strong stitching 163 is stronger and provides a stronger connection to the panel 112 than the weak stitching 164, which is weaker and provides a weaker connection to the panel 112 than the strong stitching 163. The weak stitching 164 is configured to serve as a sacrificial connection or coupling that is designed to fail at a predetermined time during the deployment of the inflatable airbag cushion 110. As discussed above, the predetermined time may be when the air pressure within the chamber 130 of the inflatable airbag cushion 110 reaches a predetermined pressure or when the chamber 130 of the inflatable airbag cushion 110 achieves a predetermined degree of deformation. In some embodiments, when the occupant 50 engages with the inflatable airbag cushion 110, the chamber 130 is deformed, which causes the pressure within the chamber 130 to increase above the predetermined pressure threshold and the weak stitching 164 fails thus releasing a majority of the vent flap 160 from the panel 112.

The strong stitching 163 may be made stronger than the weak stitching 164 in a number of different ways. For example, the strong stitching 163 may be reinforced with additional stitching, as shown in FIG. 5, to ensure that the strong stitching 163 does not fail before the weak stitching 164. In some embodiments, the strong stitching 163 may include thicker thread than the weak stitching 164. In some embodiments, the strong stitching 163 include stronger thread than the weak stitching 164. For example, the strong thread may be fabricated from a stronger material or processed differently (coatings, number of filaments, thread ply, corespun thread, corded thread, thread twist, and the like). In some embodiments, the strong stitching 163 may be disposed further away from the perimeter of the vent flap 160 than the weak stitching 164 to ensure that the strong stitching 163 does not fail before the weak stitching 164.

In some embodiments, the strong stitching 163 only comprises a small portion of the overall stitching 162. In the illustrated embodiment of FIG. 5, the strong stitching 163 is disposed in a corner (e.g., the upper right corner) of the vent flap 160.

In some embodiments, the valve 150 may further comprise additional stitching 166. In the illustrated embodiment, the stitching 166 may be a circular stitching that surrounds the aperture 152 to reinforce the rim of the aperture 152 and may thereby maintain the aperture 152 substantially open (e.g., rather than folded on itself). In other embodiments, the alternative stitching 166 may also be a weak stitching that couples the vent flap 160 to the panel 112 and that is configured to fail before the strong stitching 163. The additional stitching 166 may facilitate formation of a seal by the vent flap 160 over the aperture 152 (or otherwise enhance positioning of the vent flap 160) to limit or even prevent the inflation gas 170 from escaping the chamber 130 of the inflatable airbag cushion 110 before the valve 150 opens.

Figure 6:
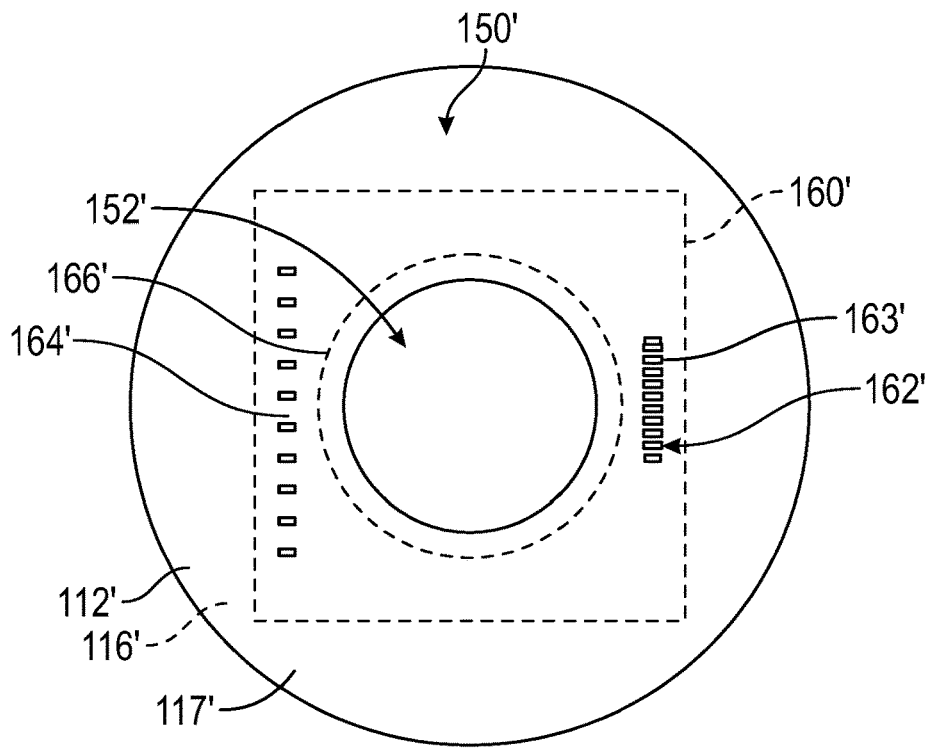
FIG. 6 is a detailed view of a valve including an aperture and a vent flap, according to another embodiment of the present disclosure, in a closed configuration.

FIG. 6 illustrates another embodiment of a valve 150' including an aperture 152' and a vent flap 160' in a closed position, configuration, or state. The vent flap 160' may be coupled to an internal chamber-facing surface 116' of a panel 112'. In some embodiments, the vent flap 160' may be coupled to an external surface 117' of the panel 112'. In the illustrated embodiment, the vent flap 160' is coupled to the internal chamber-facing surface 116' via stitching 162'. The stitching 162' includes a strong stitching 163' disposed on one side of the aperture and a weak stitching 164' disposed on the opposing side of the aperture, opposite the strong stitching 163'. In the illustrated embodiment, the strong stitching 163' is disposed in a different location than in FIG. 5. The strong stitching 163' is disposed on a right side of the aperture 152'. However, the strong stitching 163' may be located in a number of different locations around the aperture 152'. The strong stitching 163' may only comprise a relatively small portion of the overall stitching 162', which may ensure the vent flap 160' can be configured to pass through the aperture 152' when the weak stitching 164' fails. Accordingly, when the weak stitching 164' fails, the vent flap 160' will partially pass through the aperture 152'.

In the illustrated embodiment, the valve 150' may further comprise a circular stitching 166' that surrounds the aperture 152'. The circular stitching 166' may surround the aperture 152' to reinforce the rim of the aperture 152'. Alternatively, or in addition, the circular stitching 166' may couple the vent flap 160' to the panel 112' and may be a weak stitching that is configured to fail before the strong stitching 163'. The stitching 166' may be designed to facilitate formation of a seal by the vent flap 160' over the aperture 152' and help limit or even prevent the inflation gas from escaping the chamber 130 before the valve 150' opens.

Figure 7:
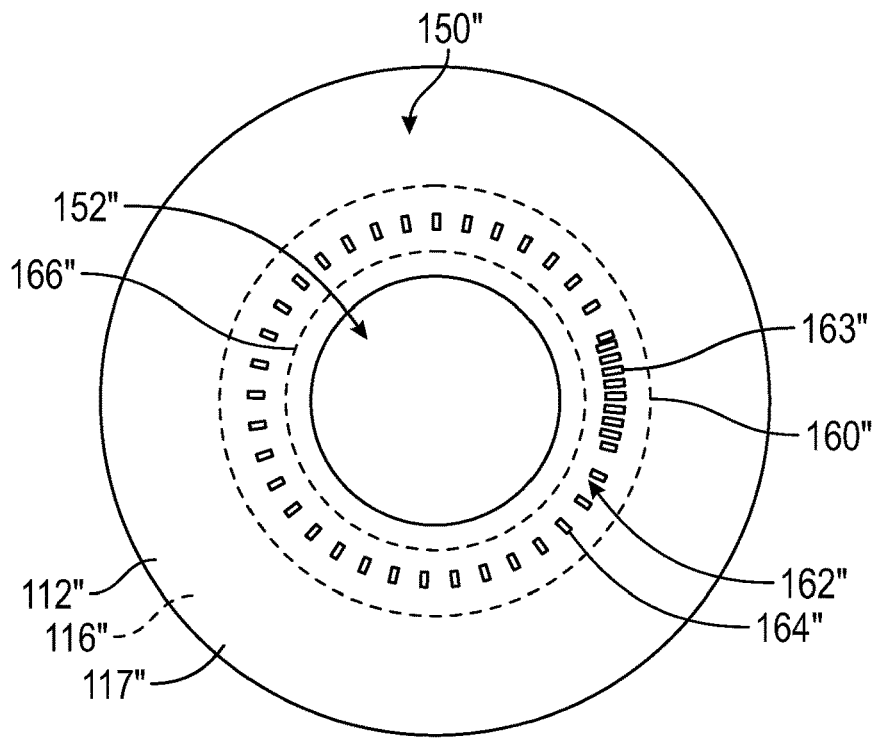
FIG. 7 is a detailed view of a valve including an aperture and a vent flap, according to another embodiment of the present disclosure, in a closed configuration.

FIG. 7 illustrates another embodiment of a valve 150" with an aperture 152" and a vent flap 160" in a closed position, configuration or state. In the illustrated embodiment, the vent flap 160" has a circular shape. The vent flap 160" may be coupled to an internal chamber-facing surface 116" of a panel 112". In some embodiments, the vent flap 160" may be coupled to an external surface 117" of the panel 112". In the illustrated embodiment, the vent flap 160" is coupled to the internal chamber-facing surface 116" via stitching 162". The stitching 162" comprises a strong stitching 163" and a weak stitching 164". Accordingly, when the weak stitching 164" fails, the vent flap 160" will partially pass through the aperture 152". However, the strong stitching 163" may be located in a number of different locations around the aperture 152". The strong stitching 163" only comprises a relatively small portion of the overall stitching 162" to ensure the vent flap 160" is configured to pass through the aperture 152" when the weak stitching 164" fails.

In the illustrated embodiment, the valve 150" may further comprise additional circular stitching 166" that surrounds the aperture 152" to reinforce the rim of the aperture 152". Alternatively, or in addition, the stitching 166" may couple the vent flap 160" to the panel 112" and may be a weak stitching that is configured to fail before the strong stitching 163". The stitching 166" may be designed to facilitate formation of a seal by the vent flap 160" over the aperture 152" and help limit or even prevent the inflation gas from escaping the chamber 130 before the valve 150" opens.

Figure 8:
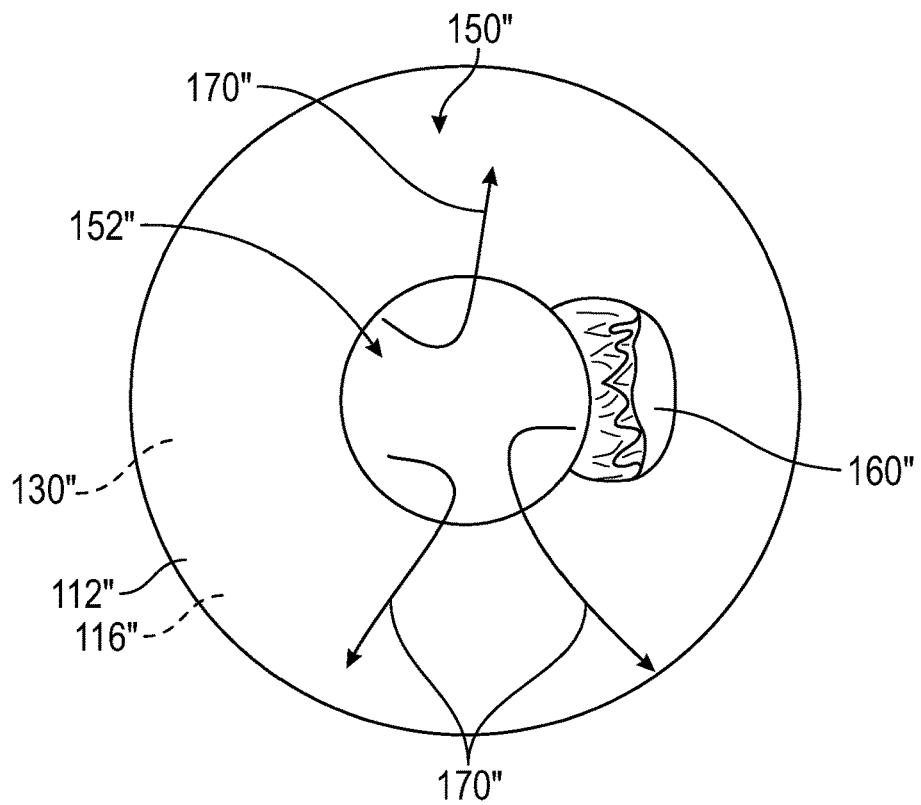
FIG. 8 is a detailed view of a valve of FIG. 7 with the vent and the vent flap in an open configuration.

FIG. 8 illustrates the valve 150" of FIG. 7 after the weak stitching 164" (see FIG. 7) has failed but the strong stitching 163" (not shown as covered by vent flap 160") is still intact to the internal chamber-facing surface 116" of the panel 112". Accordingly, the vent flap 160" is in an open configuration, position or state and partially passes through the aperture 152" as inflation gas 170" is vented from within a chamber 130" to outside the chamber 130" through the aperture 152". Because the aperture 152" is not occluded or covered by the vent flap 160", the pressure in the chamber 130" decreases creating a gradual ride-down process for the occupant 50 as the occupant 50 approaches a vehicle structure (e.g., the sidewall 16 of FIG. 1).

Throughout this specification, the phrase "coupled to" refers to any form of interaction between two or more entities, including mechanical. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The phrase "vehicle seating position" refers to a position in which an occupant is generally positioned or expected to be positioned in a vehicle (e.g., when seated in a seat of the vehicle). The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag cushion for an inflatable airbag system, the inflatable airbag cushion comprising:
   a panel at least partially defining a chamber of the inflatable airbag cushion, the chamber in fluid communication with an inflator and to receive inflation gas from the inflator to expand the inflatable airbag cushion; and
   a valve disposed in the panel and comprising:
      an aperture through the panel to permit the inflation gas to exit the chamber of the inflatable airbag cushion in a deployed state; and
      a flap coupled to the panel at the aperture at least partially by a sacrificial connection, the flap positioned initially to occlude the aperture to limit passage of the inflation gas from the chamber through the aperture until a threshold pressure of the inflation gas is achieved within the chamber,
      wherein the sacrificial connection is configured to fail upon the threshold pressure of the inflation gas being achieved within the chamber of the inflatable airbag cushion, which allows displacement of the flap to open the aperture and increase passage of the inflation gas through the aperture to depressurize the inflatable airbag cushion.

2. The inflatable airbag cushion of claim 1, wherein the flap is coupled at an internal chamber-facing surface of the panel.

3. The inflatable airbag cushion of claim 2, wherein, upon failure of the sacrificial connection, the flap is configured to partially pass through the aperture.

4. The inflatable airbag cushion of claim 1, wherein, the flap is further coupled to the panel by a strong connection.

5. The inflatable airbag cushion of claim 4, wherein the strong connection prevents the flap from fully separating from the panel.

6. The inflatable airbag cushion of claim 4, wherein the strong connection is disposed at a side of the aperture opposite the sacrificial connection.

7. The inflatable airbag cushion of claim 4, wherein the strong connection comprises stitching of a strong thread and the sacrificial connection comprises stitching of a thread weaker than the strong thread.

8. The inflatable airbag cushion of claim 1, configured to receive an occupant of a vehicle during a collision event to protect the occupant, wherein the threshold pressure of the inflation gas is achieved due to loading of the inflatable airbag cushion by the occupant.

9. The inflatable airbag cushion of claim 1, wherein displacement of the flap transitions the inflatable airbag cushion to a ride-down state.

10. The inflatable airbag cushion of claim 1, wherein the flap is positioned initially to fully cover the aperture.

11. An inflatable airbag system comprising:
an inflatable airbag cushion comprising:
a panel at least partially forming the inflatable airbag cushion; and
a valve comprising:
an aperture passing through the panel;
a closure coupled to the panel and disposed in a closed position occluding the aperture to limit inflation gas from exiting the inflatable airbag cushion through the aperture, the closure configured to be transitioned to an open position to increase passage of inflation gas through the aperture to exit the inflatable airbag cushion; and
a sacrificial coupling configured to dispose the closure in the closed position and configured to fail upon the inflation gas achieving a threshold pressure within the inflatable airbag cushion to thereby transition the closure to the open position with the aperture at least partially uncovered to increase passage of inflation gas through the aperture to exit the inflatable airbag cushion.

12. The inflatable airbag system of claim 11, wherein the sacrificial coupling couples the closure at an interior surface of the panel.

13. The inflatable airbag system of claim 11, wherein the closure is configured to partially pass through the aperture upon failure of the sacrificial coupling.

14. The inflatable airbag system of claim 11, further comprising a strong coupling configured retain the closure coupled to the panel upon failure of the sacrificial coupling.

15. The inflatable airbag system of claim 14, wherein the strong coupling prevents the closure from fully separating from the panel.

16. The inflatable airbag system of claim 14, wherein the strong coupling is disposed at a side of the aperture opposite the sacrificial coupling.

17. The inflatable airbag system of claim 14, wherein the strong coupling comprises stitching of a strong thread and the sacrificial coupling comprises stitching of a thread weaker than the strong thread.

18. The inflatable airbag system of claim 11, wherein the closure disposed in the closed position entirely prevents passage of inflation gas through the aperture and the closure disposed in the open position permits passage of inflation gas through the aperture.

19. The inflatable airbag system of claim 11, wherein the closure transitioning from the closed position to the open position transitions the inflatable airbag system to a ride-down state.

20. The inflatable airbag system of claim 11, wherein the closure positioned in the closed position fully covers the aperture.

* * * * *